United States Patent
Knighton et al.

(10) Patent No.: US 6,765,501 B1
(45) Date of Patent: Jul. 20, 2004

(54) HIGH PERFORMANCE ROTARY AXIS

(75) Inventors: Mark S. Knighton, Santa Monica, CA (US); Amit Tandon, Carson, CA (US); John Z. Zheng, Rowland Heights, CA (US); Basel F. Bahhour, Garden Grove, CA (US); Marc Goldman, Santa Monica, CA (US); David D. Drobnis, Mar Vista, CA (US); Theodore J. Hauser, Simi Valley, CA (US)

(73) Assignee: NextEngine, Inc., Santa Monica, CA (US)

( * ) Notice: Subject to any disclaimer, the term of this patent is extended or adjusted under 35 U.S.C. 154(b) by 0 days.

(21) Appl. No.: 10/285,063

(22) Filed: Oct. 31, 2002

(51) Int. Cl.[7] ................................................. H03M 1/22
(52) U.S. Cl. ........................................... 341/2; 384/906
(58) Field of Search ........................... 341/2, 9, 15, 16, 341/10, 11, 12; 123/190.4, 190.5, 190.6, 190.8; 384/906; 403/26, 301, 306; 250/231.13

(56) References Cited

U.S. PATENT DOCUMENTS

| | | | | |
|---|---|---|---|---|
| 4,246,478 A | * | 1/1981 | Nishiyama et al. | .... 250/231.13 |
| 4,358,753 A | * | 11/1982 | Cascini | ........................ 341/2 |
| 4,788,422 A | * | 11/1988 | Fujiwara | ................ 250/231.13 |
| 5,799,218 A | * | 8/1998 | Aoki | ........................... 396/297 |
| 5,803,041 A | * | 9/1998 | Motakef | ...................... 123/225 |
| 5,941,206 A | * | 8/1999 | Smith et al. | ............. 123/190.4 |
| 6,020,875 A | * | 2/2000 | Moore et al. | ............... 345/156 |
| 6,318,055 B1 | * | 11/2001 | Bird | .............................. 56/6 |
| 6,542,088 B1 | * | 4/2003 | Bielski et al. | ................ 341/15 |

* cited by examiner

Primary Examiner—Michael Tokar
Assistant Examiner—Linh Van Nguyen
(74) Attorney, Agent, or Firm—Blakely, Sokoloff, Taylor & Zafman, LLP

(57) ABSTRACT

A high performance rotary axis. An upper and lower unit are coupled together by a pair of bearings to permit relative rotation between the units. The bearings are biased relative to others along a link to reduce play between the bearings. A processor and sensor provide for detection of relative positions between the units. A floating stop may be provided to permit rotation about the axis in greater than 360°.

18 Claims, 5 Drawing Sheets

US 6,765,501 B1

HIGH PERFORMANCE ROTARY AXIS

BACKGROUND OF THE INVENTION

1. Field of the Invention

The invention relates to a rotary axis. More specifically, the invention relates to a low-cost, high-performance motorized platform that minimizes play during rotation and recovers from clutching events.

2. Background

A high-performance rotary platform should typically address three kinds of problems. First, the rotational movement of the platform should be precise and minimize play. Second, the platform should be able to recover from clutching events, such as when a user attempts to forcibly rotate the platform or impede its rotation. Finally, the platform should be able to accommodate different kinds of equipment with different power, data, and signal cabling needs while being able to rotate freely. These factors have contributed to the unavailability of motorized platforms that have a low unit cost and, correspondingly, a low part count.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION OF THE INVENTION

There are many contexts in which a high precision rotary axis may be desirable. Among these contexts is image capture of panoramic images. Precision control of the rotation of the capture device greatly facilitates assembly of the ultimate image and reduces the data processing required. While this is one context in which an embodiment of the invention may be used for other uses and embodiments.

Figure 1:
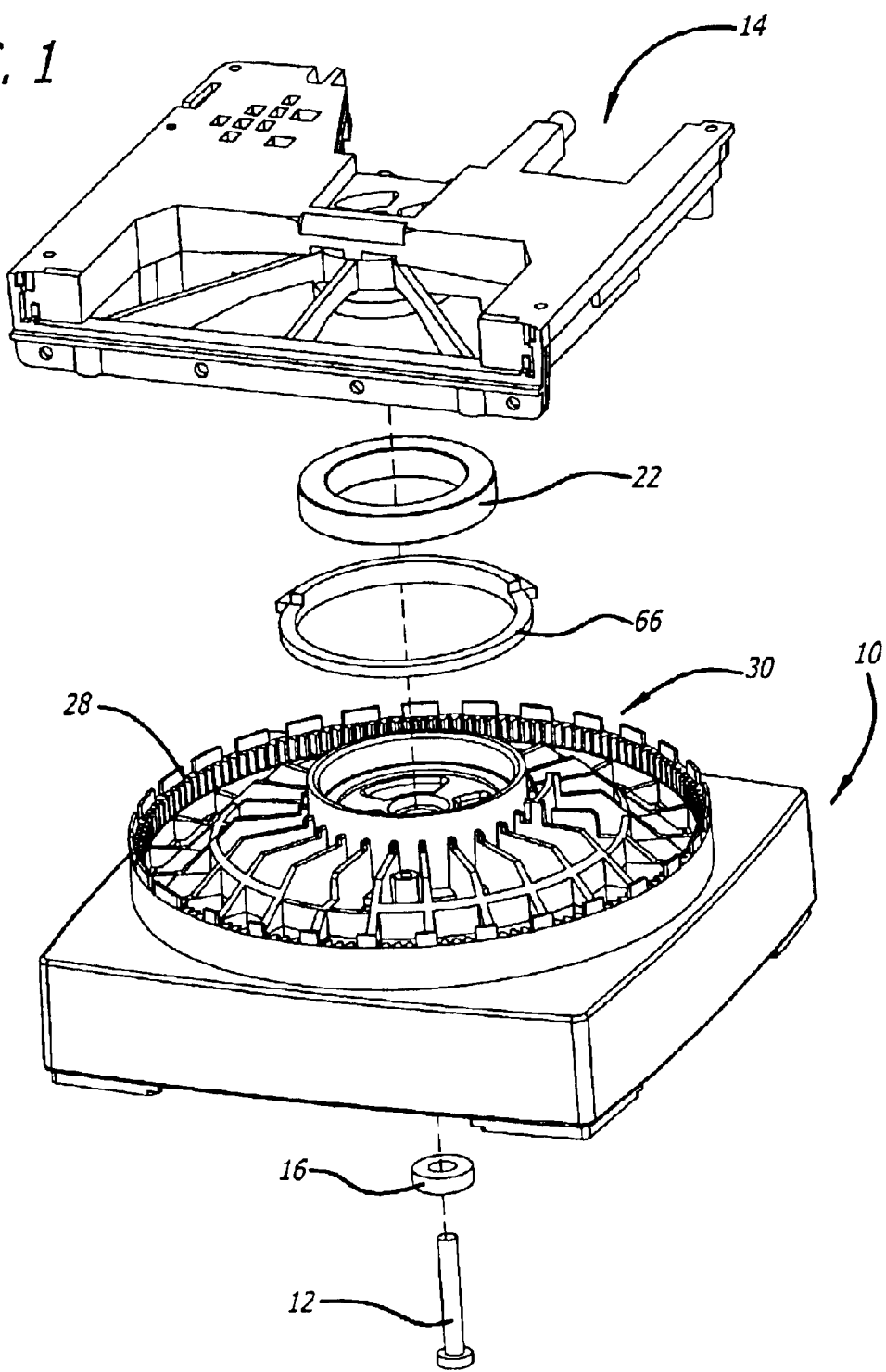
FIG. 1 is an exploded view of the rotary axis of one embodiment of the invention.

FIG. 1 is an exploded view of the rotary axis of one embodiment of the invention. Upper unit 14 is rotatably coupled to lower unit 10 via bearings 22, 16. Upper unit 14 is alternatively referred to as the "frame." Lower unit 10 is alternatively referred to as the "base." Lower unit 10 is coupled to lower bearing 16, which is rotatably coupled to center shaft 12. Upper unit 14 is rotatably coupled to upper bearing 22, which is coupled to lower unit 10. Upper unit 14 and lower unit 10 may provide areas for placement of an actuator 24, a processor 26, and other electronics (see FIG. 3). In one embodiment of the invention, lower unit 10 defines an internal drive gear 28 and a plurality of positioning blades 30. In one embodiment, the internal drive gear 28 and positioning blades are formed as a single integral molded part. Internal drive gear 28 may be driven by actuator 24 under control of processor 26. The plurality of positioning blades 30 are spaced around a circle defined on lower unit 10 to permit sensor 50 (see FIGS. 4 and 5) coupled to upper unit 14 to detect the passage of each blade during rotation of upper unit 14 relative to lower unit 10. Processor 26 is also coupled to sensor 50 and can determine the location of the upper unit 14 relative to lower unit 10 based on signals received from sensor 50. In one embodiment of the invention, rotation of upper unit 14 relative to lower unit 10 may be limited to less than 720° by floating stop 66. Upper unit 14 and lower unit 10 may be molded out of glass filled Acrylonitrile Butadiene Styrene (ABS), a thermoplastic, or may be manufactured out of metal or some other suitably rigid material based on the expected load.

Figure 2:
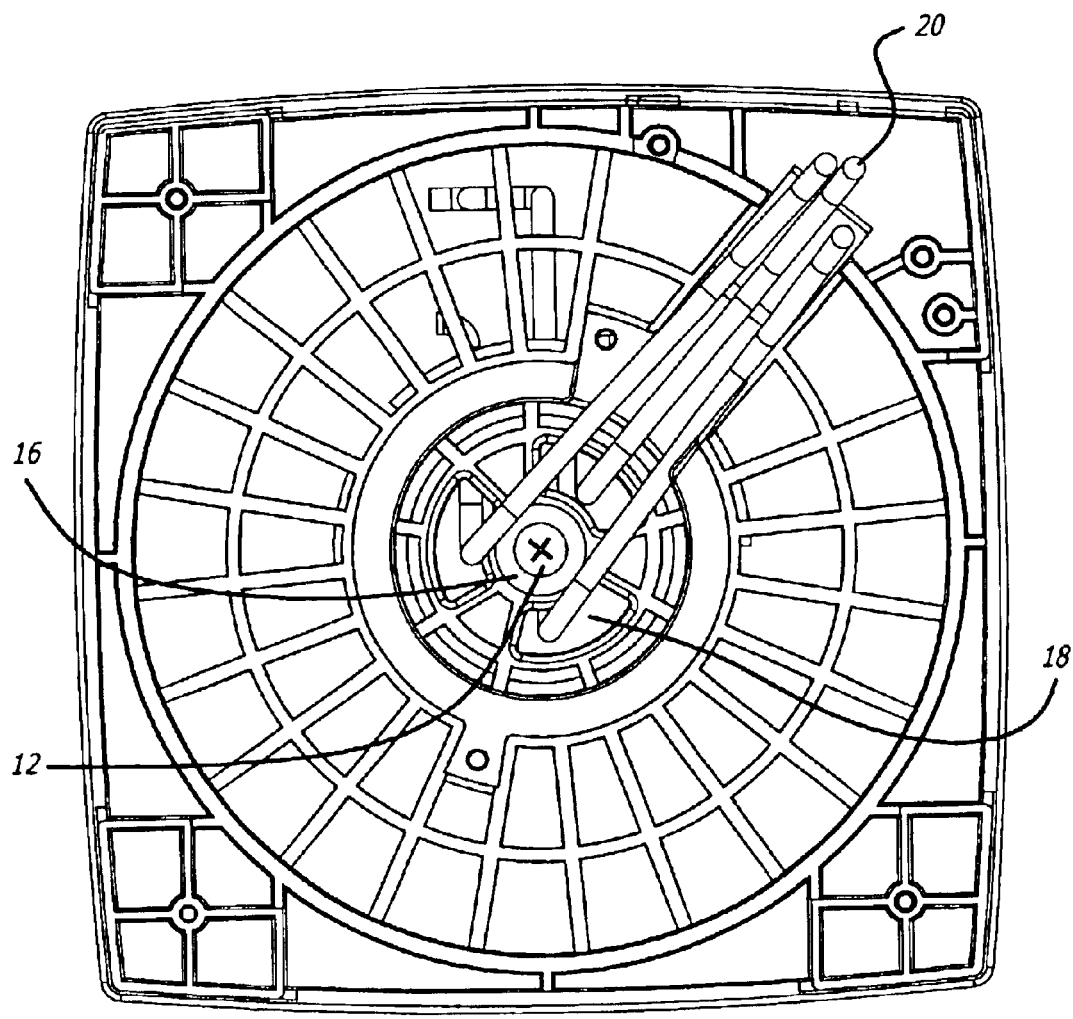
FIG. 2 is a bottom view of the rotary axis of one embodiment of the invention.

FIG. 2 is a bottom view of the rotary axis of one embodiment of the invention. Lower bearing 16 is coupled to lower unit 10 and mounted to permit the center shaft to rotate relative to the lower unit 10. In one embodiment of the invention, a plurality of power, data and signal connections 20 such as cables, flexible circuits, or other similar devices may be fed around lower bearing 16 through one or more channels 18 to upper unit 14. In another embodiment of the invention, lower bearing 16 could be made larger to accommodate the plurality of connections 20 through its center. However, this would require an additional structure (not shown) to couple lower bearing 16 to center shaft 12. A fan (not shown) may also be coupled to lower unit 10 to drive air through one or more channels 18 to upper unit 14 to provide cooling for any heat producing components residing in the upper unit 14.

Figure 3:
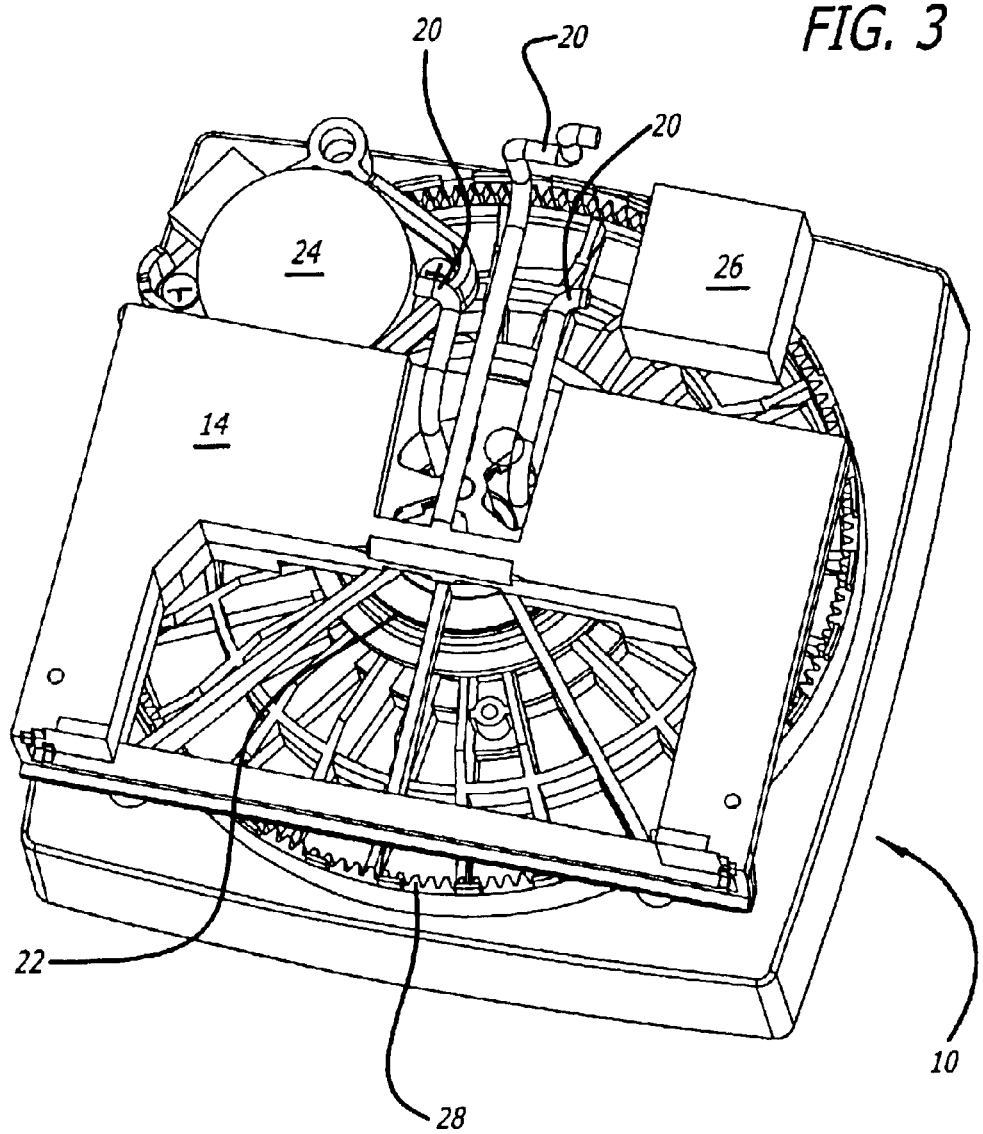
FIG. 3 is a top view of the rotary axis of one embodiment of the invention.

FIG. 3 is a top view of the rotary axis of one embodiment of the invention. Upper bearing 22 is coupled to lower unit 10 and mounted to rotate relative to center shaft 12. In one embodiment of the invention, the plurality of connections 20 passing around lower bearing 16 may be fed through one or more channels 18 and then through upper bearing 22. This allows upper unit 14 to rotate without entangling the plurality of connections 20. Upper unit 14 may have an actuator 24 to drive internal drive gear 28 in lower unit 10. As used herein, an actuator may include a galvo, a servo, a solenoid, a piezoelectric motor, an electric motor, or other similar devices. In one embodiment of the invention, actuator 24 may be a bi-directional motor that may cause relative rotation in either of two directions between upper unit 14 and to lower unit 10. The actuator may drive one or more gears that form a gear assembly which in turn engage internal drive gear 28. In one embodiment of the invention, internal drive gear 28 is part of upper unit 14 with actuator 24 coupled to lower unit 10.

Figure 4:
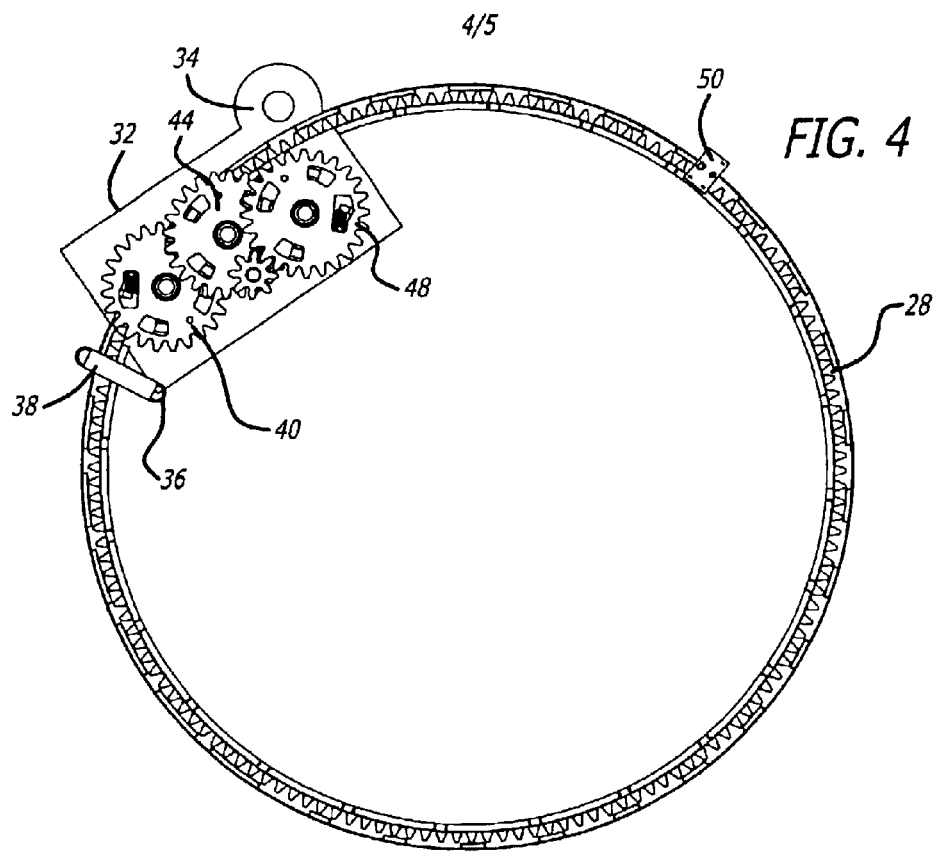
FIG. 4 is a bottom view of the gear assembly of one embodiment of the invention.

FIG. 4 is a bottom view of the gear assembly of one embodiment of the invention. Gear box 32 on which actuator 24 and a gear assembly is mounted, is pivotally coupled to upper unit 14 at pivot point 34. An opposing end of the gear box 32 is coupled to biasing spring 38, which is also coupled to an inner portion of upper unit 14. Biasing spring 38 causes compound gear 40 to engage internal drive gear 28 in lower unit 10. Compound gear 40 is driven by compound gear 44, which in turn is driven by compound gear 48, which is driven by actuator 24. In one embodiment of the invention, the gear ratio from the actuator 24 to the internal drive gear 28 is 506. In another embodiment of the invention, the compound gears 40, 44, and 48 may be anti-backlash gears.

The biasing spring 38 in conjunction with the pivotal connection at pivot point 34 creates a clutching function between compound gear 40 and internal drive gear 28 of lower unit 10. Additionally, the spring bias takes out inconsistencies related to manufacturing imprecision or wear on the teeth of internal drive gear 28. The clutching function further permits less expensive gears to be used as it reduces the risk of teeth breakage. The clutching function occurs when a force is applied in either the forward or reverse direction greater than the resultant spring force (e.g., clutching). When this occurs, compound gear 40 will disengage from internal drive gear 28 of lower unit 10 as gear box 32 pivots away from such engagement. By appropriately selecting the spring and the angle of pivot of the gear box, risk of gear damage by clutching the upper unit 14 is minimized and the force required to clutch may be approximately the same in both directions.

Also mounted on upper unit 14 is sensor 50 which is disposed so as to be along the positioning blade (30 in FIG. 1) travel path. Accordingly, the plurality of positioning blades 30 defined by lower unit 10 trigger sensor 50 and make possible the detection of clutching events. Detection of clutching events is discussed below with reference to FIG. 5. It is also within the scope and contemplation of the invention for the positioning blades to be part of the upper unit and have the sensor mounted on the lower unit.

Figure 5:
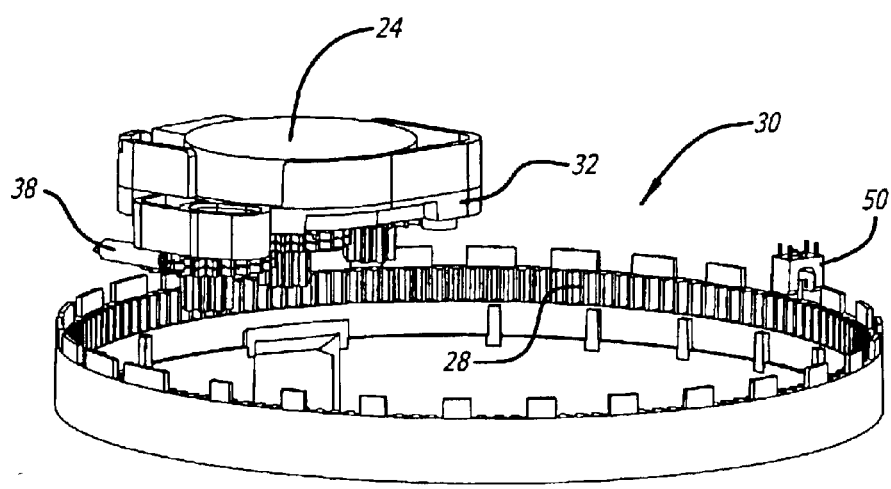
FIG. 5 is another view of the gear assembly of one embodiment of the invention.

FIG. 5 is another view of the gear assembly of one embodiment of the invention. Positioning blades 30 are arranged around a circle defined on lower unit 10. The circle is divided into segments of equal size each segment having a blade. In one embodiment, each blade, however, has a unique cross dimension relative to the other blades. In one embodiment of the invention, the blades are rectangular in shape. Generally, any shape that can have a unique cross dimension may be used. Thus, other shapes are within the scope and contemplation of the invention. In one embodiment, the positioning blades 30 and the internal drive gear 28 are formed as part of lower unit 10 during the molding process. This reduces the part count and, hence, the cost of manufacture.

Sensor 50 is coupled to upper unit 14 and detects changes in the ratio between blade cross dimension and segment size as upper unit 14 rotates relative to lower unit 10. It is the relative motion that permits detection. Thus, various embodiments may rotate the sensor while the blades remain fixed in a global coordinate system, while other embodiments may fix the sensor in the global coordinate system and rotate the blades. As used herein, detecting a change in ratio is deemed to include detecting the cross dimension of a blade even if no explicit ratio is actually calculated. In one embodiment of the invention, positioning blades 30 may be defined by upper unit 14 and sensor 50 may be coupled to the lower unit 10. In another embodiment of the invention, sensor 50 may be an optical sensor (e.g., a photo interrupter) or other such similar devices, such that positioning blade edges are detected as the upper unit 14 rotates sensor 50 across the blades.

By determining the location of sensor 50, processor 26 can ascertain the position of upper unit 14 relative to lower unit 10. In one embodiment of the invention, processor 26 determines sensor location based on the time elapsed between detection of positioning blade edges and a known relative speed between lower unit 10 and sensor 50. In another embodiment of the invention, the relative motion between lower unit 10 and sensor 50 is in discrete steps (e.g., via a stepping motor) and processor 26 may determine sensor location based on the number of steps between detection of blade edges. In one embodiment, combination of logic or an ASIC may be employed instead of processor 26.

Positioning blades 30 make possible the discovery of clutching events. A clutching event occurs when a user forcibly rotates or impedes the rotation of upper unit 14, thus putting upper unit 14 out of synchronization with lower unit 10. Processor 26 can predict, based on the last positioning blade detected by sensor 50 and the direction of rotation, when a blade edge should next be detected by sensor 50. If upper unit 14 is clutched, the detection of the next blade edge will not coincide with the predicted value. If the expected number of edges are not detected within the expected number of steps, a clutching event is presumed to have occurred. In that case, processor 26 can cause actuator 24 to return upper unit 10 to its proper position, for example, by signaling actuator 24 to move upper unit 14 relative to lower unit 10 until sensor 50 detects the last blade edge encountered before the clutching event occurred. In one embodiment, processor 26 correlates the blade edges with the commands to the actuator to reduce error between expected and actual angular displacement on a substantially continuous basis.

Figure 6:
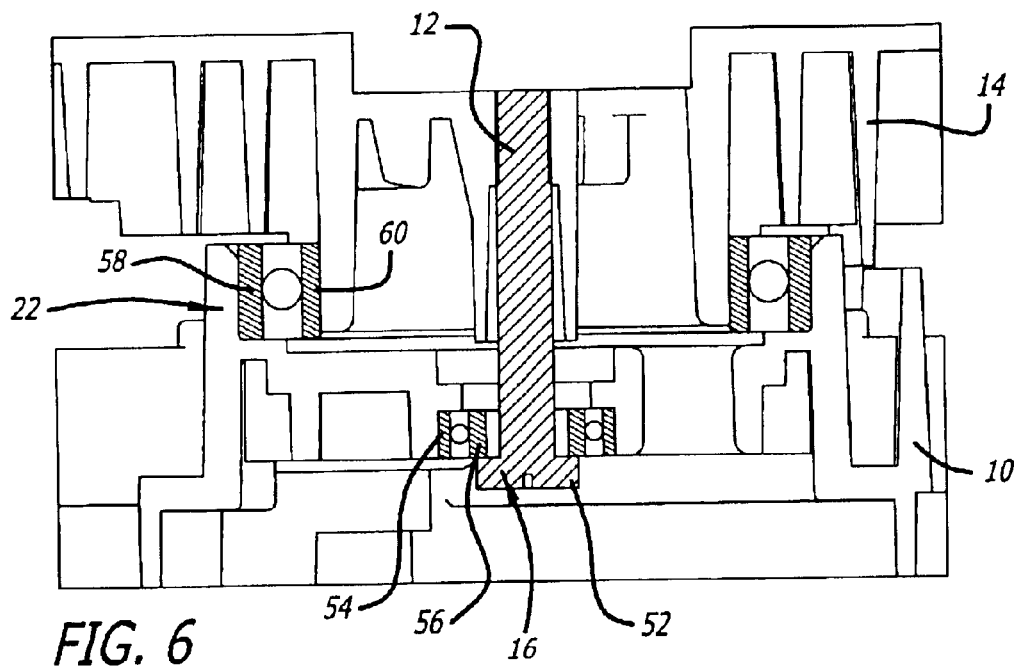
FIG. 6 is a cross-sectional view of the rotary axis of one embodiment of the invention.

FIG. 6 is a cross-sectional view of the rotary axis of one embodiment of the invention. Lower bearing 16 is rotatably coupled to center shaft 12. In one embodiment of the invention, center shaft 12 may be a screw, a cylinder with attachment points, or other such similar apparatuses. Center shaft 12 may have a head 52. Inner race 56 of lower bearing 16 may be supported by head 52. A washer may also be used. Lower unit 10 rides on outer race 54 of lower bearing 16. Lower unit 10 supports outer race 58 of upper bearing 22. Upper unit 14 rides on inner race 60 of upper bearing 22 and rotates relative to lower unit 10. Lower bearing 16 is biased by head 52 towards upper bearing 22 and conversely, upper bearing 22 is biased by upper unit 14 towards lower bearing 16, such that vertical play between upper bearing 22 and lower bearing 16 is reduced along center shaft 12 during rotation of upper unit 10. This permits the pair of low cost bearings to emulate the precision of much more expensive multiple row bearings.

Figure 7:
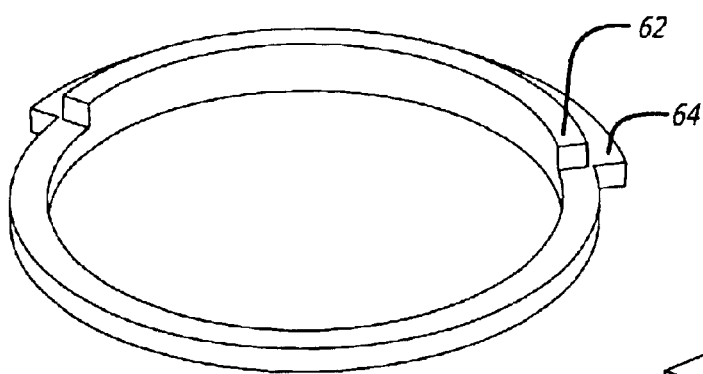
FIG. 7 is a view of a floating stop of one embodiment of the invention.

In some embodiments, rotation of greater than 360° is desirable. In such embodiments, a fixed stop is impractical. FIG. 7 is a view of a floating stop of one embodiment of the invention. Floating stop 66 is interposed between upper unit 14 and lower unit 10 to permit rotational travel of upper unit 14 relative to lower unit 10 in greater than 360° but less than 720°. The range of rotation is limited by the sizes of the arc of the lips. For example, assuming the upper lip 62 and lower lip 64 each cover a 60° arc and the stop tab 68 covers a 30° arc and the push tab 70 covers a 30°, maximum rotation would be 540°. Without a floating stop, clutching events and/or over rotation could cause undue stress on the plurality of connections 20 running through lower unit 10 to upper unit 14. Floating stop 66 has an upper lip 62, a lower lip 64, and a hollow center through which center shaft 12 and the plurality of connections 20 pass. The upper and lower lips are aligned with each other along the circumference of floating stop 66. In one embodiment of the invention, the lips may not be so aligned. In another embodiment of the invention, upper lip 62 and lower lip 64 may each be comprised of two posts rather than solid tabs.

Figure 8:
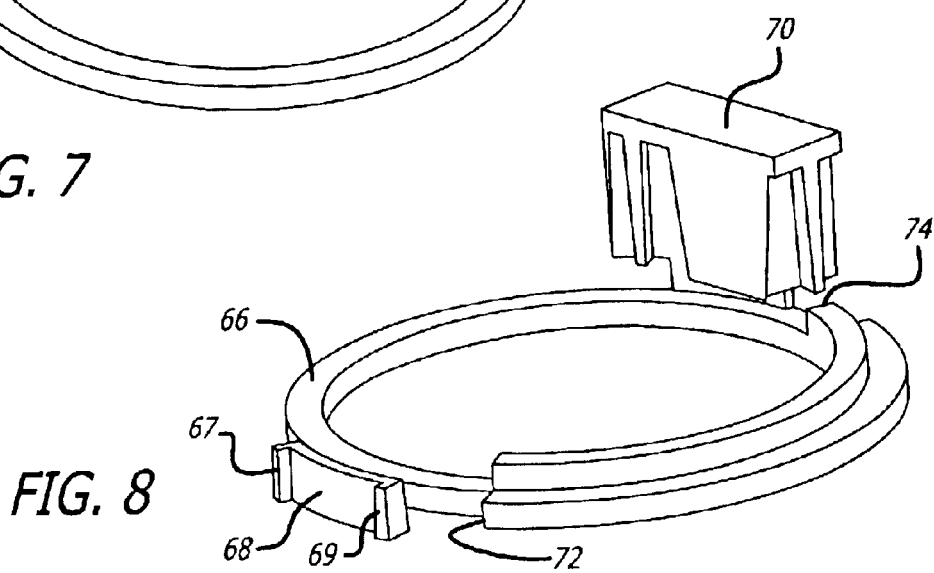
FIG. 8 is another view of a floating stop of one embodiment of the invention.

The range of motion of the floating stop results from the engagement of one lip by a portion of e.g., the upper unit and engagement of the other lip by e.g., a portion of the lower unit. Referring now to FIG. 8, it is another view of a floating stop of one embodiment of the invention. The upper and lower lips on floating stop 66 both terminate at points 72 and 74. Push tab 70 is coupled to upper unit 14. Stop tab 68 is coupled to lower unit 10. Rotation of upper unit 14 causes rotation of side tab 70. Push tab 70, in turn, causes floating stop 66 to rotate by engaging upper lip 62 at endpoint 72 or 74. Floating stop 66 will rotate freely until lower lip 64 engages stop tab 68 at endpoint 72 or 74.

Thus, rotating the upper unit, and therefore the push tab clockwise causes floating stop to rotate until lower lip abuts right end 69 of stop tab 68. The upper unit is free to rotate counter clockwise for 360° less the dimension of upper lip 74 before it will begin pushing the floating stop counter clockwise for an additional 360° less the dimension of the lower lip 64 and the dimension of stop tab 68 until lower lip 64 at endpoint 74 abuts the left side of stop tab 68 at endpoint 67. While push tab 70 and stop tab 68 are shown with a particular shape, nearly any shape or dimension is within the scope and contemplation of the invention.

While one floating stop has been described in detail, other floating stops are also within the scope and contemplation of the invention. For example, an arcuatate track could be defined in the lower unit having an arc dimension of e.g., 60° a rigid member extending from and engaging the track could be engaged by a push tab to push the rigid member to one end of the track. This permits maximum rotation in the opposite direction of 360° plus the track dimension. Other examples exist. The important characteristics of a floating stop include the ability to permit rotation of greater than 360° and to effect a hard stop at some range beyond 360°.

In the foregoing specification, the invention has been described with reference to specific embodiments thereof. It will, however be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. An apparatus comprising:
   a first structure;
   a first bearing coupled to the first structure;
   a second bearing coupled to a second structure;
   a link coupled to the second structure and in tension with the second bearing to bias the bearings along the link relative to each other to reduce play between the first structure relative to the second, while permitting rotation of the second structure relative to the first structure.

2. The apparatus of claim 1, wherein the first bearing has a smaller diameter than the second bearing.

3. The apparatus of claim 1, wherein a plurality of cables are routed through at least one of the first bearing and the second bearing.

4. The apparatus of claim 1 further comprising:
   a floating stop interposed between the first structure and the second structure to permit the rotational travel of the second structure relative to the first structure of greater than 360° but less than 720°.

5. The apparatus of claim 1 further comprising:
   a third structure coupled to one of the first structure and the second structure, wherein the third structure is divided into a plurality of blades separated by gaps, at least one of each blade and each gap having a unique cross dimension;
   a sensor to detect edges of the blades; and
   logic to determine an angular displacement of the first structure relative to the second structure based on the detected edges.

6. The apparatus of claim 5 wherein the third structure is integrally formed from a single piece of material with one of the first structure and the second structure.

7. The apparatus of claim 5 further comprising:
   an actuator coupled to one of the first structure and the second structure; and
   a drive assembly driven by the actuator to drive rotation of one of the first structure and the second structure;
   wherein the logic is coupled to the actuator to use edge detection data to determine commands to the actuator to reduce error in a relative angular displacement of the first structure and the second structure.

8. The apparatus of claim 1 wherein the first bearing and the second bearing are separated along a rotational axis to resist forces normal to the rotational axis.

9. The apparatus of claim 1 further comprising:
   an actuator coupled to one of the first structure and the second structure;
   a drive assembly driven by the actuator to drive rotation of one of the first structure and the second structure relative to the other of the first structure and the second structure, the device assembly pivotally coupled to one of the first structure and the second structure; and
   a spring coupled to the drive assembly and a point on one of the first structure and the second structure to bring the drive assembly into engagement with the other one of the first structure and the second structure.

10. The apparatus of claim 9 wherein the spring and the drive assembly in combination perform a clutching function.

11. The apparatus of claim 9 wherein spring biases the drive assembly into engagement with the other of one of the first structure and the second structure to compensate for shape distortions in the other of one of the first structure and the second structure.

12. The apparatus of claim 9 wherein the drive assembly resists backdriving.

13. The apparatus of claim 9 wherein the other of the first structure and the second structure is formed of a single piece of material having integral features to engage the drive assembly.

14. A rotary encoder comprising:
    a first unit divided into a plurality of blades separated by gaps at least one of each blade and each gap having a unique cross dimension;
    a second unit rotationally movable relative to the first unit;
    a sensor coupled to the second unit to detect edges of the blades when the second unit moves relative to the first unit; and
    logic to determine an angular displacement of the first unit relative to the second unit based on the detected edges.

15. A rotary encoder of claim 14 further comprising:
    an actuator to cause relative motion between the first unit an the second unit.

16. The rotary encoder of claim 14, wherein the logic determines the angular displacement based on commands to the actuator and detection of blade edges.

17. The rotary encoder of claim 16 wherein the logic further to use the edges detected to determine commands to the actuator to reduce error in a relative angular displacement of the first structure and the second structure.

18. An apparatus comprising:
    a first structure;
    a second structure rotationally coupled to the first structure; and a floating stop interposed between the first structure and the second structure to permit rotational travel of the second structure relative to the first structure in greater than 360° but less than 720°.

* * * * *